United States Patent
Ordberg

Patent Number: 5,975,422
Date of Patent: Nov. 2, 1999

[54] CLIMATIZING ARRANGEMENT AND A METHOD FOR CONTROLLING THE SAME

[75] Inventor: Jimmy Ordberg, Trollhattan, Sweden

[73] Assignee: Saab Automobile AB, Sweden

[21] Appl. No.: 09/091,658

[22] PCT Filed: Dec. 19, 1996

[86] PCT No.: PCT/SE96/01719

§ 371 Date: Jan. 11, 1999

§ 102(e) Date: Jan. 11, 1999

[87] PCT Pub. No.: WO97/22488

PCT Pub. Date: Jun. 26, 1997

[30] Foreign Application Priority Data

Dec. 20, 1995 [SE] Sweden ................................ 9504564

[51] Int. Cl.⁶ ................................................ B60H 1/02
[52] U.S. Cl. ................................. 237/12.3 A; 237/2 A
[58] Field of Search ....................... 237/12.3 A, 2 A; 454/75, 139

[56] References Cited

U.S. PATENT DOCUMENTS

| | | | |
|---|---|---|---|
| 4,242,950 | 1/1981 | Grossmann. | |
| 5,186,237 | 2/1993 | Adasek et al. | 165/42 |
| 5,203,498 | 4/1993 | Kajikawa | 237/2 A |
| 5,388,421 | 2/1995 | Matsuoka | 62/209 |
| 5,566,880 | 10/1996 | Khelifa et al. | 237/12.3 A |
| 5,678,761 | 10/1997 | Ikeda | 237/2 B |
| 5,699,960 | 12/1997 | Kato et al. | 237/2 A |
| 5,711,368 | 1/1998 | Ito et al. | 165/42 |

*Primary Examiner*—Henry Bennett
*Assistant Examiner*—Derek S. Boles
*Attorney, Agent, or Firm*—Ostrolenk, Faber, Gerb & Soffen, LLP

[57] ABSTRACT

The present invention relates to a climatizing arrangement and to a method for controlling a climatizing arrangement, preferably air-conditioning equipment, for adjusting the temperature in the interior (7) of a vehicle, with individual regulation of the temperature of the air to different outlets (5, 6). The climatizing arrangement consists of an air-conducting system (2, 3, 4), a fan (1) for generating an air flow and a heat exchanger (8) for heating the air in cold weather. In warm weather the heat exchanger (8), in this case switched off, is instead utilized to provide flow resistance. The partial air flow to each outlet (5, 6) is then caused to pass through the heat exchanger or to bypass the heat exchanger (8), so that the flow rate is reduced in each air flow. Individual exhaust rates, and thus subjective sense of temperature, is thus obtained for each outlet (5, 6).

10 Claims, 1 Drawing Sheet

CLIMATIZING ARRANGEMENT AND A METHOD FOR CONTROLLING THE SAME

The present invention relates to a climatizing arrangement and method for controlling the same. The invention is preferably intended for use in ventilating the interior of a vehicle if the ventilation air does not need to be heated but instead needs to be cooled, at least subjectively.

BACKGROUND ART

It is often desirable when air-conditioning the interior of a vehicle to be able to set different temperatures for two or more zones in the vehicle, e.g. right/left and/or front/rear, since the passengers may have differing views concerning a comfortable temperature and, e.g. because the sun may heat different parts of the interior to a differing extent. This is particularly important in hot weather when air flowing into the vehicle need not be heated, but rather cooled. The temperature subjectively experienced by a passenger is dependent not only on the actual temperature of the air, but also on its quantity, rate of flow and humidity.

Thus, besides affecting the actual temperature of the air, the subjective temperature can be altered by altering the air velocity. Increased air velocity gives a sense of lower temperature. Individual subjective temperature can be obtained even if the temperature of the air is the same, by arranging a separate fan to the exhaust opening in each zone, each fan being individually regulated.

Besides arranging separate fans, separate heat exchangers may also be arranged for factual heating and cooling of the air temperature to the different zones. However, this generally entails complicated and bulky air-conditioning systems which are not easily fitted into the limited space available in ordinary private vehicle. They are also extremely expensive solutions. Common to the above-mentioned solutions is that they require a considerable amount of space, and are complicated and expensive.

OBJECT OF THE INVENTION

The object of the present invention is therefore to provide a simpler and less expensive system for individual regulation of the outflow velocity and quantity of air to the various zones.

SUMMARY

The invention is thus applicable to air-conditioning equipment which is provided with a heat exchanger for heating the air in cold weather. In hot weather a property normally considered as negative is exploited, i.e. that of the heat exchanger exerting flow resistance on the air passing through it, but the air is not heated since the heat exchanger is switched off. The flow resistance through the heat exchanger reduces the velocity of the air flow, which is experienced as a higher temperature. The control members arranged individually for the exhaust opening of each zone are used to regulate how large a proportion of the air flow shall pass through the heat exchanger and how large a proportion shall bypass it, and thus the resulting velocity of the air blown out, which determines how the temperature is experienced. Utilizing the flow resistance of a heat exchanger already provided in the equipment in order to individually influence the velocity of the exhaust air greatly simplifies the construction of the equipment, eliminating the need for separate fans.

The same control members are preferably used as those regulating the passage of air past/through the heat exchanger in cold weather when the heat exchanger heats the air.

A branch pipe is suitably arranged to each outlet, the heat exchanger covering a part of the through-flow area of each branch pipe and a damper regulating the bypass or through-flow of the air.

The control members may be designed having either simple on/off function or continuous control.

Additional characteristics and advantages of invention, as well as advantageous embodiments of the invention, are revealed in the following embodiment of the invention described by way of example and with reference to the accompanying drawing.

DESCRIPTION OF A PREFERRED EMBODIMENT

Figure 1:
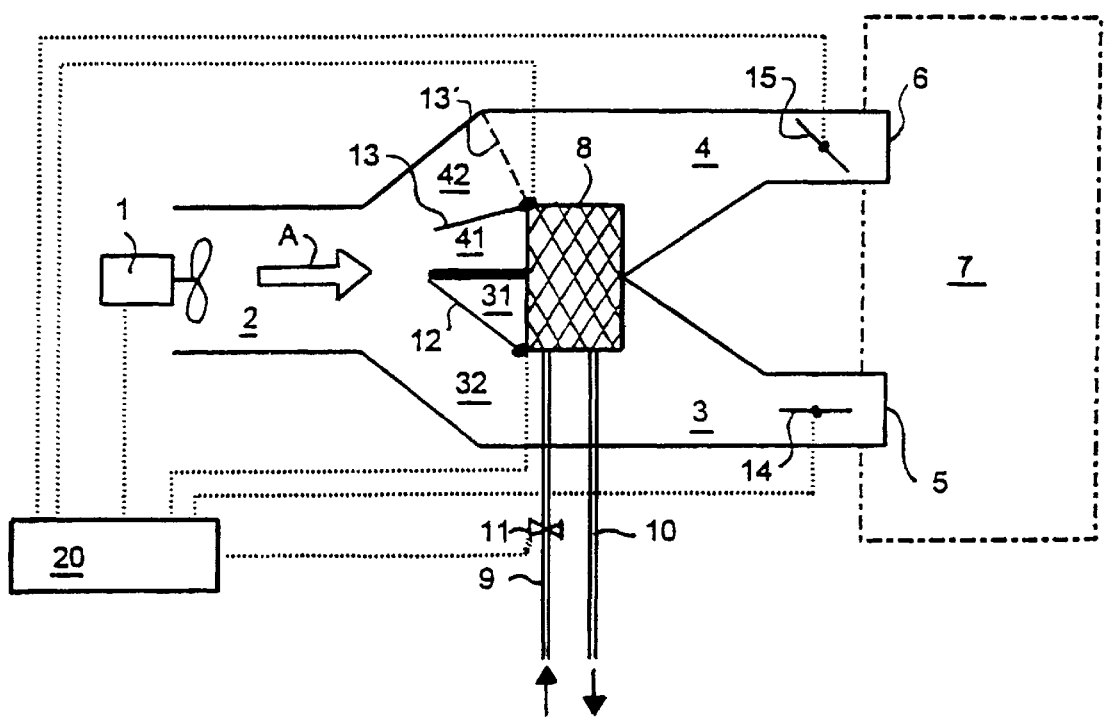
FIG. 1 is a basic layout section through air-conditioning equipment in accordance with the present invention.

FIG. 1 shows schematically the air channels in air-conditioning equipment in a vehicle such as a private vehicle. Air flows in a main pipe 2 pressurized by a fan 1, for instance in the direction of the arrow A and is then divided into an air flow in each of the branch pipes 3 and 4. Each branch pipe opens into its own zone of the interior 7 of the vehicle through the exhaust outlets 5 and 6 arranged on the passenger side and on the driver's side, for instance. A heat exchanger 8 is arranged in the channel system, through which coolant from the engine of the vehicle can circulate through inlet and outlet pipes 9, 10. The inlet pipe 9 is provided with a valve 11 for continuous control or total restriction of the supply of coolant. The heat exchanger 8 extends into both branch pipes 3, 4 and takes up a part of the through-flow area of each branch pipe.

The air flow in each branch pipe can be controlled by a damper 12, 13 in each branch pipe 3, 4, so that it passes to a varying extent through the corresponding part of the heat exchanger. Each branch pipe 3, 4 thus comprises a pipe portion 31, 41 in which air flowing through is heated by the heat exchanger, and also a pipe portion 32, 42 in which the air is not heated by the heat exchanger. The dampers 12, 13 are regulated independently of each other and independently of the valve 11 to the heat exchanger 8. Each damper 12, 13 is located in a plane perpendicular to the figure and can be turned about an axis perpendicular to the figure at its downstream end. In cold weather when the heat exchanger 8 is activated by the valve 11 being open to permit circulation of coolant through the heat exchanger, the dampers 12, 13 regulate how large a proportion of each air flow shall be conducted through the various pipe portions 31, 32, 41, 42, and thus how large a proportion of the air flow shall be heated through passage through the heat exchanger. The heated portions of the air flow are then mixed with the bypassed, unheated portions of the air flow downstream of the heat exchanger so that the resultant air temperature at each exhaust outlet 5, 6 is dependent on the setting of the corresponding damper 12, 13. This aspect of the function of the air-conditioner to obtain different air temperatures of the air flowing out of the exhaust outlets 5, 6 is known per se and in general use.

In hot weather, when the interior of the vehicle does not need to be heated, but rather the temperature lowered if possible, the heat exchanger is deactivated by closing the valve 11. According to the invention the dampers 12, 13 are also in this case utilized to guide a portion of the air flow through respective pipe portions 31, 32, 41, 42 of the branch pipes 3, 4.

Thanks to its constructional design, the heat exchanger provides increased or reduced flow resistance so that the pressure and velocity of the part of the air flow passing through it, i.e. through the heated pipe portions 31, 41 are reduced. In the example shown in the figure, the lower damper 12 is in a position in which all air in the branch pipe 3 is conducted through the unheated pipe portion 32, thus bypassing the heat exchanger 8. The air thus flows through the branch pipe 3 to its outlet 5 at full speed. The upper damper 13 is set in an intermediate position so that some of the air in the branch pipe 4 is forced to pass through the heated pipe portion 41 (although in fact no heating occurs), and thus through the corresponding part of the heat exchanger 8 so that its velocity is reduced. This air is then mixed downstream of the heat exchanger 8 with the air passing through the unheated pipe portion 42. The velocity of the air when it reaches the outlet 6 of the branch pipe 4 is thus reduced, depending on how much of the air is directed by the damper 13 through the heated pipe portion 41 and through the heat exchanger 8. In the example shown. therefore, maximal subjective cooling effect is achieved in the zone in the interior 7 of the vehicle into which the outlet 5 of the lower branch pipe 3 opens, whereas the subjective cooling effect in the zone around the second outlet 6 is at an intermediate level. If the damper 13 in the branch pipe 4 were to be set in the upwardly angled position represented by the broken line 13', all air in this branch pipe 4 would be forced to pass through the heated pipe portion 41 and through the heat exchanger 8, resulting in the lowest possible velocity for the air flowing through the corresponding outlet 6, and thus the lowest subjective cooling effect in the corresponding zone of the space 7.

Should a larger control area be desired than is achieved through the use of the maximum pressure drop achievable by the heat exchanger 8, a simple throttle damper 14, 15 may be placed in each channel 3, 4. This enables the individual exhaust rate through each opening 5, 6 to be further regulated. In alternative embodiments these throttle dampers 14, 15 may consist of panel nozzles that can be regulated directly by the driver or passenger.

The individual cooling is thus achieved through individual regulation of the outflow rate through each outlet 5, 6. A common means, the fan 1, is used to generate the air flow and already existing members regulating heating in cold weather, the dampers 12, 13 and heat exchanger 8, are used for this individual regulation of the outflow rate in warm weather.

The air-conditioning equipment is advantageously controlled automatically by an electric control system and the dampers are then regulated by means of electric servomotors. In the drawing this is illustrated by a control system 20, preferably in the form of an electric, microcomputer-based control system which is connected with the servo-means for each damper 12–15, fan 1 and valve 11, by cables indicated by broken lines. The control system 20 also suitably comprises a control panel of conventional design on which a desired, subjective temperature of the air through each exhaust outlet 5, 6 can be set manually. All the driver or passenger need do is set a desired "temperature impression", whereupon the control unit 20 will accordingly adjust the velocity of the fan and adjustment of the dampers 12–15 and valve 11. It is thus the lowest temperature selected which will determine the velocity of the fan, and the air to be conducted to the corresponding outlet will bypass the heat exchanger entirely. For the person who has chosen a higher temperature, the air will be caused to pass to a greater or lesser extent through the heat exchanger to give it a lower flow rate and thus the impression of being warmer than the air flowing out through the other outlet, although in reality the temperature of the air through both outlets is the same. If the air is to be heated the heat exchanger is activated and the air flowing through it is heated. In that case the air-condition equipment functions in known manner, the dampers 12, 13 then regulating the degree of warmth in the air flowing out through the outlets 5, 6.

What is claimed is:

1. A climatizing arrangement, comprising:

a heat exchanger through which air passes and which is arranged to receive a heat medium for heating the air passing therethrough;

control means for regulating the flow of the heat medium through the heat exchanger, the control means being closable to stop the flow of the heat medium through the heat exchanger;

means for receiving air from a source of air and conducting a proportion of the air through the heat exchanger and a portion of the air around the heat exchanger, said air receiving and conducting means having at least two outlets to a space to be climatized; and control members to regulate how large a proportion of the air flow from the source of air to each outlet passes through the heat exchanger and how much passes around the heat exchanger to thereby control the temperature of the air flowing out through the outlets, the control members being arranged such that, when the control means for controlling the flow of the heat medium through the heat exchanger is closed, at least one of the control members is arranged to pass air to one of the outlets through the heat exchanger so that the velocity of the air to the one outlet is reduced by the flow resistance of the heat exchanger.

2. A climatizing arrangement as claimed in claim 1, wherein the control members are individually adjustable dampers.

3. A climatizing arrangement as claimed in claim 2, wherein the control members are continuously adjustable so that 0 to 100% of the air flowing to each outlet can be caused to flow through the heat exchanger.

4. A climatizing arrangement as claimed in claim 1, wherein additional individually regulated control members are arranged in the air flow to each outlet to regulate the air flow to the outlets.

5. A climatizing arrangement as claimed in claim 1, wherein the control members are controlled by an electrical control system.

6. A method for controlling a climatizing arrangement designed to bring air in a space to a suitable temperature, said arrangement including a heat exchanger through which air passes and which is activatable to receive a heat medium for heating the air passing therethrough; air conducting means having at least two outlets to the space; and control members which regulate how large a proportion of the air to each outlet passes through the heat exchanger or bypasses it to achieve individual temperature-control of the air supplied to the outlets, the method comprising the steps of: when heating is not required, deactivating the heat exchanger so that the heat exchanger does not receive the heat medium and so that the air flowing through the heat exchanger is not heated, and regulating how large a proportion of the air flow to a selected one of the outlets is conducted through the heat exchanger, the flow resistance of the heat exchanger being utilized to reduce the velocity of the air flow directed to the selected outlet.

7. A method as claimed in claim 6, wherein the regulation of how large a proportion of each air flow is conducted through the heat exchanger is achieved by adjusting the control members.

8. A method as claimed in claim 6, wherein substantially the whole air flow to the non-selected one of the outlets is caused to bypass the heat exchanger, and substantially the entire air flow to the selected one of the outlets air is conducted through the heat exchanger.

9. A method as claimed in claim 8, wherein a fan is provided in the air conducting means, a driving speed of the fan is regulated to achieve a desired flow of air to the non-selected outlet and the velocity of the flow of air to the selected outlet is reduced by regulating how large a proportion of this air is conducted through the heat exchanger by means of the control members.

10. A method as claimed in claim 9, in which the flow of air to the selected one of the outlets which passes through the heat exchanger may be adjusted from 0 to 100% by individual adjustment of the control members.

* * * * *